United States Patent
Sandstrom

(10) Patent No.: US 8,769,543 B2
(45) Date of Patent: Jul. 1, 2014

(54) SYSTEM AND METHOD FOR MAXIMIZING DATA PROCESSING THROUGHPUT VIA APPLICATION LOAD ADAPTIVE SCHEDULING AND CONTEXT SWITCHING

(75) Inventor: Mark Henrik Sandstrom, Jersey City, NJ (US)

(73) Assignee: Throughputer, Inc., Jersey City, NJ (US)

( * ) Notice: Subject to any disclaimer, the term of this patent is extended or adjusted under 35 U.S.C. 154(b) by 405 days.

(21) Appl. No.: 12/982,826

(22) Filed: Dec. 30, 2010

(65) Prior Publication Data

US 2012/0079494 A1   Mar. 29, 2012

Related U.S. Application Data

(60) Provisional application No. 61/417,259, filed on Nov. 25, 2010, provisional application No. 61/386,801, filed on Sep. 27, 2010.

(51) Int. Cl.
*G06F 9/46* (2006.01)

(52) U.S. Cl.
USPC .......................................... 718/104; 718/102

(58) Field of Classification Search
USPC ...................................... 718/1–108
See application file for complete search history.

(56) References Cited

U.S. PATENT DOCUMENTS

| | | | | |
|---|---|---|---|---|
| 6,108,683 | A * | 8/2000 | Kamada et al. | 718/103 |
| 6,721,948 | B1 * | 4/2004 | Morgan | 718/102 |
| 7,765,547 | B2 * | 7/2010 | Cismas et al. | 718/100 |
| 7,861,063 | B1 * | 12/2010 | Golla et al. | 712/214 |
| 8,001,549 | B2 * | 8/2011 | Henmi | 718/108 |
| 8,032,889 | B2 * | 10/2011 | Conrad et al. | 718/103 |
| 2002/0129080 | A1 * | 9/2002 | Hentschel et al. | 709/102 |
| 2002/0143843 | A1 * | 10/2002 | Mehta | 709/102 |
| 2004/0210900 | A1 | 10/2004 | Jones et al. | |
| 2005/0055694 | A1 | 3/2005 | Lee | |
| 2006/0059485 | A1 * | 3/2006 | Onufryk et al. | 718/100 |
| 2006/0195847 | A1 | 8/2006 | Amano et al. | |
| 2008/0077927 | A1 * | 3/2008 | Armstrong et al. | 718/104 |
| 2009/0178047 | A1 * | 7/2009 | Astley et al. | 718/104 |
| 2010/0153955 | A1 * | 6/2010 | Sirota et al. | 718/102 |
| 2011/0154348 | A1 * | 6/2011 | Elnozahy et al. | 718/104 |
| 2012/0173734 | A1 * | 7/2012 | Kimbrel et al. | 709/226 |
| 2012/0222042 | A1 * | 8/2012 | Chess et al. | 718/105 |

FOREIGN PATENT DOCUMENTS

WO         00/70426  A2   11/2000

* cited by examiner

*Primary Examiner* — Abdullah Al Kawsar

(57) ABSTRACT

The invention enables dynamic, software application load adaptive optimization of data processing capacity allocation on a shared processing hardware among a set of application software programs sharing said hardware. The invented techniques allow multiple application software programs to execute in parallel on a shared CPU, with application ready-to-execute status adaptive scheduling of CPU cycles and context switching between applications done in hardware logic, without a need for system software involvement. The invented data processing system hardware dynamically optimizes allocation of its processing timeslots among a number of concurrently running processing software applications, in a manner adaptive to realtime processing loads of the applications, without using the CPU capacity for any non-user overhead tasks. The invention thereby achieves continuously maximized data processing throughput for variable-load processing applications, while ensuring that any given application gets at least its entitled share of the processing system capacity whenever so demanded.

8 Claims, 3 Drawing Sheets

| period # | cycle # | application # |
|---|---|---|
| t-1 | 0 | D |
|  | 1 | D |
|  | 2 | D |
|  | 3 | H |
|  | 4 | H |
|  | 5 | H |
|  | 6 | H |
|  | 7 | H |
|  | 8 | H |
|  | 9 | H |
|  | 10 | H |
|  | 11 | H |
|  | 12 | H |
|  | 13 | H |
|  | 14 | H |
|  | 15 | P |

| period # | cycle # | application # |
|---|---|---|
| t | 0 | A |
|  | 1 | A |
|  | 2 | C |
|  | 3 | F |
|  | 4 | K |
|  | 5 | K |
|  | 6 | K |
|  | 7 | K |
|  | 8 | K |
|  | 9 | K |
|  | 10 | K |
|  | 11 | K |
|  | 12 | K |
|  | 13 | K |
|  | 14 | P |
|  | 15 | P |

| period # | cycle # | application # |
|---|---|---|
| t+1 | 0 | B |
|  | 1 | B |
|  | 2 | E |
|  | 3 | E |
|  | 4 | E |
|  | 5 | J |
|  | 6 | J |
|  | 7 | J |
|  | 8 | J |
|  | 9 | J |
|  | 10 | J |
|  | 11 | J |
|  | 12 | J |
|  | 13 | J |
|  | 14 | J |
|  | 15 | K |

FIG. 2

SYSTEM AND METHOD FOR MAXIMIZING DATA PROCESSING THROUGHPUT VIA APPLICATION LOAD ADAPTIVE SCHEDULING AND CONTEXT SWITCHING

CROSS REFERENCE TO RELATED APPLICATIONS

This application is related to, and claims the benefit of:
[1] U.S. Provisional Application No. 61417259, filed Nov. 25, 2010;
[2] U.S. Provisional Application No. 61386801, filed Sep. 27, 2010;
[3] U.S. Utility application Ser. No. 12/869,955, filed Aug. 27, 2010; and
[4] U.S. Utility application Ser. No. 12/713,143, filed Feb. 25, 2010,
which are incorporated by reference in their entirety.

BACKGROUND

1. Technical Field

The invention pertains to the field of digital data processing systems, particularly to the field of optimizing data processing throughput of data processing systems, through application program load adaptive scheduling of processing time among the application programs.

2. Descriptions of Related Art

Traditional data processing systems, e.g. general purpose computers, rely on operating system (OS) software functionality for scheduling and switching access to the processing system hardware between a number of application software programs that are configured to run on the given shared processing system hardware, referred to as the central processing unit (CPU) of the system. Often, this function of the OS to allocate the CPU time among the application software programs and to schedule and select the individual applications to execute on the shared CPU hardware on their assigned time slices can occupy a significant portion of the processing time capacity of that CPU. Moreover, while the CPU of the given multi-user system is assigned to a given user's application programs for a given time period, all the other users' application programs have to wait, making no progress, thus causing unpredictable, and often unacceptably latent or irregular, user application performance.

Thus, with any conventional OS software based application scheduling, the application programs sharing given processing hardware (CPU) will experience variable delays in waiting for their turn on executing on the CPU. Further still, the more frequently the conventional OS scheduler would run its scheduling and context switching procedures, to change executing applications, in order to reduce the delays the experienced by the individual applications in waiting to execute on the CPU, the greater the portion of the CPU time that is spent by running the OS, thus reducing the portion of the CPU time available for the user applications that such conventional data processing system is intended to serve.

These factors create a need for innovations that enable efficiently scheduling application programs to execute on shared CPUs, while minimizing both the CPU time overhead used for such scheduling and switching functions as well as the delays and delay variations experienced by the applications in waiting their turn to execute on the CPU, in order to maximize the data processing throughput and user application performance of the shared processing system hardware across the range of user software applications that the shared processing system serves.

SUMMARY

The invention provides data processing systems and methods enabling multiple application software programs to execute in parallel on a shared processing hardware, with application ready-to-execute status adaptive scheduling of CPU cycles and context switching between applications done in hardware logic, without a need for software involvement.

In an embodiment, the invention provides an application load adaptive digital data processing system, comprising (1) a central processing unit (CPU) for processing instructions and data from its input data arrays and storing results in output data arrays, and (2) a scheduler for periodically, once per a CPU cycle capacity allocation period, producing a schedule assigning the CPU cycles on an upcoming allocation period among a set of processing applications sharing the CPU. Moreover, the producing of said CPU cycle to application assignment schedule is done in an embodiment of the invention based on indications by the set of processing applications expressing whether a given processing application is currently ready to use one or more CPU cycles on the upcoming allocation period.

A further embodiment of the invention provides an application load adaptive digital data processing method, comprising steps of (1) by at least one application among a set of software applications sharing a given processing hardware, maintaining in a hardware device register a ready-to-execute status indicator to be used in determining an optimal allocation of the processing hardware capacity among said set of applications, (2) by a scheduler hardware logic, periodically determining an optimal allocation of the shared processing hardware capacity among the set of applications at least in part based on the ready-to-execute status indicators of one or more of the applications sharing the given processing hardware, and (3) by the shared processing hardware, processing of instructions and data of the set of processing applications according to the determined optimal allocation of the processing hardware capacity by the scheduler hardware logic.

Embodiments of the invention also incorporate a hardware logic algorithm for allocating capacity of a shared CPU among a set of processing applications, comprising algorithm steps of (1) monitoring ready-to-execute indicators of a set of processing software applications expressing at least one of the following (a) whether a given software application is currently ready to execute on the CPU, and (b) how many CPU cycles the given application is a currently able to consume, (2) once in a CPU cycle allocation period, allocating the CPU cycles on an upcoming allocation period among the processing applications sharing the CPU based on values of the ready-to-execute indicators of one or more of said set of applications, (3) and controlling time division multiplexing of the CPU capacity among said set of processing software applications according to the allocation of the CPU cycles by the scheduler logic.

BRIEF DESCRIPTION OF THE DRAWINGS

FIG. 2 illustrates examples of processing cycle to application allocation schedules for the system of FIG. 1, in accordance with an embodiment of the invention.

Figure 1:
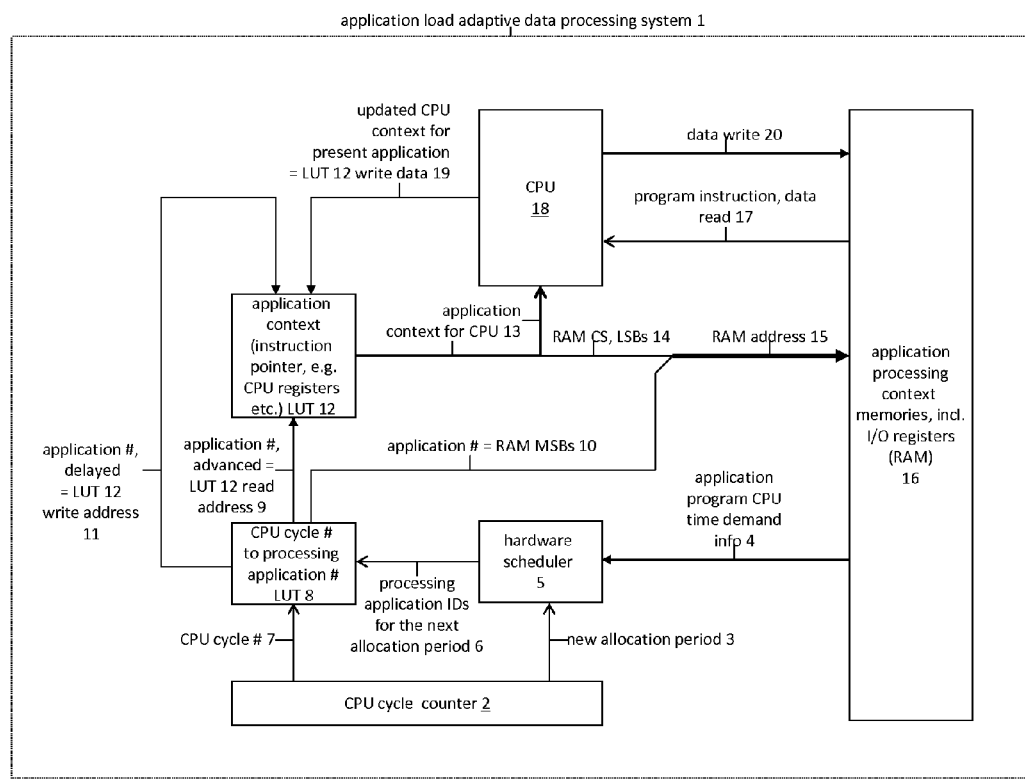
FIG. 1 shows, in accordance with an embodiment of the invention, a functional block diagram for an application processing load adaptive data processing system, involving scheduling logic producing schedules that allocate processing cycles on the system hardware among a set of processing software applications running on the system.

The following symbols and notations used in the drawings:

- Boxes indicate a functional logic module, such as a digital look-up-table (LUT).
- Solid arrows indicate a data signal flow. A signal flow may comprise one or more parallel bit wires.
- Arrows ending into or beginning from a bus represent joining or disjoining of a sub-flow of data or control signals into or from the bus, respectively.
- Lines and arrows between nodes in the drawings represent a logical communication path, and may consist of one or more physical wires. The direction of arrow does not preclude communication in also the opposite direction, as the directions of the arrows are drawn to indicate the primary direction of information flow with reference to the below description of the drawings.

The figures depict embodiments of the invention for purposes of illustration only. One skilled in the art will readily recognize from the following discussion that alternative embodiments of the structures and methods illustrated herein may be employed without departing from the inventive principles presented herein.

DETAILED DESCRIPTION

The invention is described herein in further detail by illustrating the novel concepts in reference to the drawings.

Figure 3:
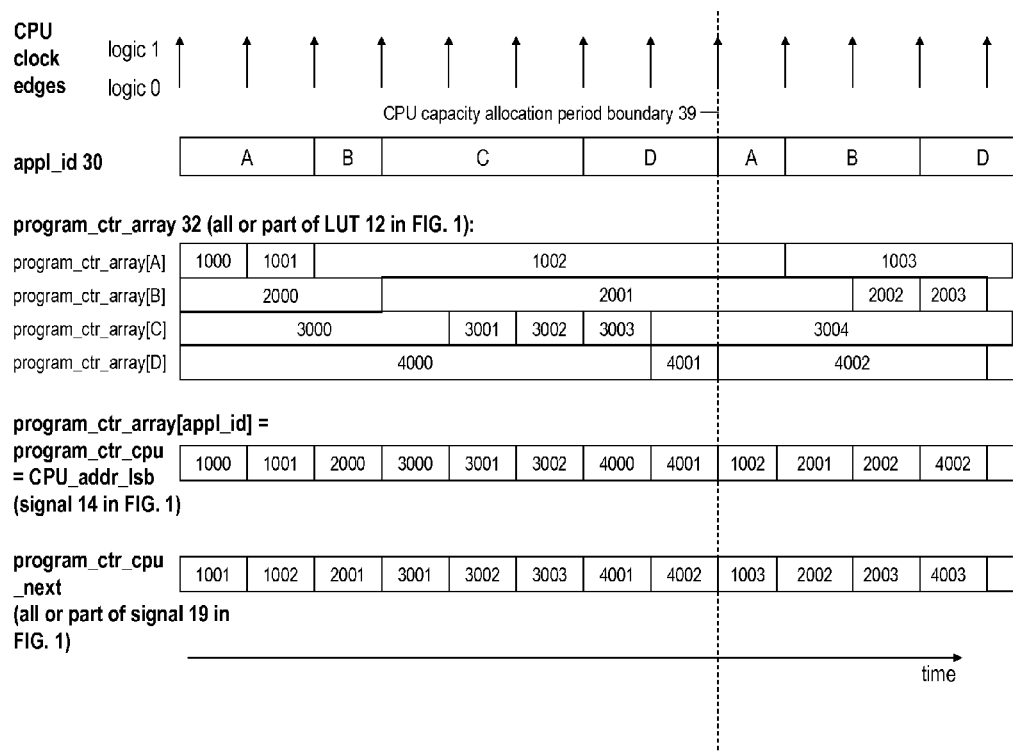
FIG. 3 illustrates, in accordance with an embodiment of the invention, time sharing of the shared processing hardware of the system of FIG. 1 according to assumed sequences of system processing cycle to processing application allocation schedules.

The invention illustrated in the FIGS. 1-3 involves techniques for dynamic, software application load adaptive optimization of time sharing of data processing capacity among a set of application software programs configured to run on the given processing hardware.

The invented data processing capacity allocation optimization method comprise as the main functional steps (1) by the set of software applications configured to share a given processing hardware, maintaining in hardware device registers their respective ready-to-execute status indicators to be used in determining a system data processing throughput optimizing allocation of the processing hardware capacity among said set of applications, (2) by a scheduler algorithm in hardware logic of the system, periodically determining the system throughput optimizing allocation of the shared processing hardware capacity among said set of applications at least in part based on the ready-to-execute status indicators of the set of software applications running on the given processing hardware, and (3) by the shared processing hardware, processing of instructions and data of the set of processing applications, wherein the sequences of applications to be processed by the processing hardware are based on the optimal allocation schedules of the processing hardware capacity as determined by the scheduler hardware logic.

FIG. 1 presents a functional logic block diagram for an application load adaptive shared data processing system 1, according to an embodiment of the invention.

The data processing system of FIG. 1 involves a novel hardware scheduler, enabling optimally time-sharing the data processing system hardware (referred to as a central processing unit, CPU) among multiple application software programs, while keeping the CPU processing capacity allocated for the actual application programs, and while eliminating the delays that conventionally are experienced by the application programs in waiting their turn to execute on the shared CPU running a traditional operating system software scheduler.

Main operating principle of the invented data processing system 1 with overhead-free scheduling and context switching mechanisms are as follows:

Embodiments of the invention according to FIG. 1 provide a time-division-multiplexing based CPU capacity sharing method, wherein a number of processing software applications execute on the CPU hardware 18 in a timeslot (e.g. individual clock cycle, or instruction cycle) interleaved manner, and wherein the allocation of the CPU processing capacity among the processing applications is performed by a scheduler logic 5 in a manner adaptive to the realtime processing loads of the set of processing applications configured to run on the system 1. The hardware scheduler 5 monitors information 4 from these processing applications in the system expressing whether any given application is currently able to use on an upcoming CPU allocation period (comprising, e.g., 64 instruction cycles) one or more CPU cycles, and accordingly optimizes the allocation of the CPU cycles among the processing applications on successive allocation periods, configuring 6 a CPU cycle # to application # assignment table 8 as a result. The contents of this assignment table 8, in turn, control 9, 10 which application program context 13, 17 is selected to direct the processing at the CPU hardware 18 on any given CPU cycle.

The processing context of any given processing application is maintained in the CPU memory segments (within memories 12, 16) dedicated to the given application. Once the given application is scheduled to execute on the CPU, its processing context 17, 13 is multiplexed from the RAM 16 and LUT 12 to direct the data processing on the CPU 18, and similarly the results of processing, including output data and updated processing context 20, 19, are written back to RAM 16 and LUT 12 segments dedicated to the given application following each CPU cycle consumed by that application program.

In a particular embodiment, the incoming application context (program counter, or instruction pointer as it may also be called, etc.) is multiplexed 13 from an application#-indexed array 12, with an advanced-timing version of the new application's ID#9, into the CPU for use in executing instruction for that application, and the same time as the outgoing (i.e. present) application's context (program counter i.e. CPU RAM LSBs, etc.) are de-multiplexed and stored 19 into the same array 12 with the present application's ID#11. Note that incoming and outgoing applications can be the same, or different, at any successive CPU cycles.

Thereby, according to the invention, the user application programs on system 1 remain at their active processing state, often referred to as running state, as long as the given application program has further processing to perform (i.e. until the application program altogether terminates, or the application switches to passive mode of waiting some external event to happen, before it can resume processing). As such, enabled by the invention, there thus is no need for particular distinction between 'ready' and 'running' states of software applications or their tasks, as multiple applications and tasks can remain in their running states concurrently; in effect, any given active application program only sees the CPU cycles on which it was scheduled to execute on the CPU, while these applications time-sharing the CPU hardware remain in their ready-to-resume-processing (i.e. running) states over the intervening CPU cycles assigned to other applications.

Accordingly, embodiments of the invention cause the CPU processing capacity to be continuously and dynamically shared in a fair and optimized manner among a number of application programs, based at least in part on realtime ready-to-execute status of the applications, without using any of the CPU time for system functions such as time tick processing, interrupt service routines, application scheduling or context switching. In fact, enabled by the invented mechanisms, the need for a computing platform operating system, at least for the purpose of scheduling and switching the executing application programs, can be eliminated in various computing applications, e.g. computers operating as shared processing hardware for a number of user application programs.

To provide further practical context for the discussion herein regarding the invented concepts, the following general notes are to be made:

Note that the concept of application specific memory segment in this discussion refers to the collection of CPU-accessible registers and memories dedicated to the software application in question; in FIG. 1 for simplicity all these per-application-dedicated memory segments are presented as part of one common random access memory (RAM 16, with the exception of the LUT 12 storing the application context specific memory LSB and chip select bits), though in various embodiments the memory elements, including any processor registers, segments of read only memory, fast access on-chip and low cost off-chip memories that constitute the memory segment used by a given processing application can reside in different memory devices. In such cases where elements of the memory segment of a processing application reside e.g. in different hardware chips or physical CPU memory spaces, the principle of the invention can be implemented so that all the individual memory facilities used by the processing applications contain application specific sub-segments within them, and the CPU memory bus "MSBs" 9 of FIG. 1 will be used to activate the correct segments within such separate memory facilities, while the correct memory facilities for any given memory access operation are selected by their associated chip select (CS) bit wires.

In accordance with the above discussion, to form the complete CPU physical memory address 15 in a manner where all the CPU accessible memory resources are mapped to one continuous address space, the CS bits from the LUT 12 are to occupy the 'literal' most significant bits, the LSBs from the LUT 12, the literal least significant bits, and the 'MSBs' from LUT 8 the bit positions in between them. Naturally, the number of bits for each of the aforementioned classes are to be specified to practical values for any given implementations of system 1 per FIG. 1.

For instance, where the processing contexts for the processing applications of system 1 are stored in a fast (same CPU cycle) assess on-chip RAM resource, the 'MSBs' 10 refer primarily to the address range selector bits within the memory space of that RAM facility, which itself can be mapped to occupy one continuous memory range within the entire physical memory space of the CPU. The same intra-memory device segmentation to application specific sub-segments can be applied to any and all of the memory and input/output (I/O) facilities accessible by the CPU 18 of system 1 as well.

Further, in accordance with the above discussion permitting the conceptual CPU memory space 16 to comprise several logical or physical data storage resources, it shall be understood that also the data bus 20 can in certain embodiments comprise a number of parallel subsections (e.g. bit ranges) that connect to a number of different data storage facilities, e.g., in scenarios where a number of such memory facilities are allowed to be concurrently selected (i.e. have their CS inputs at their active states, which moreover in further embodiments can be allowed to overlap for read or even write operations across multiple different memory and I/O facilities).

Moreover, the invented hardware logic based, overhead-free scheduling mechanisms per above can in embodiments naturally be used also for scheduling the running software tasks within an application program as well as across application programs. In commercial utility type computing utilization scenarios of the invention, the invented scheduling and context switching mechanisms are to be used primarily between the set of processing application programs, which can be understood as mutually competitive users of the shared CPU hardware in a sense that they can be in the service of different commercial (end-)customers. In such commercial utilization scenarios, which are the primary focus of the use cases discussed herein, the main objective of the scheduling logic 5 is optimize the system 1 processing throughput while ensuring that all applications get no less than their contract based entitled share of the CPU cycles (e.g., 10%) whenever they are able to offer at least that level of processing load to the CPU. On the other hand, for utilization scenarios of the invention for scheduling tasks of application programs serving the same user, a key goal of the scheduler function 5 may be task prioritization, in order to achieve best possible user experienced system performance. Other than such differences in the objective of the scheduler algorithm, as far as the rest of the system 1 is concerned, what is referred to herein as a processing application in commercial multi-user computing scenarios is analogous with the concept of a task in single user computing scenarios.

While a central scheduler (element 5 in FIG. 1) is used to perform the scheduling between the processing applications, the prioritization, scheduling and switching of tasks or threads within an application context can be handled internally by their respective applications, using e.g. conventional OS software methods or mechanisms based on this invention.

The CPU accessible memories 16 in FIG. 1 are to be understood to include also input/output communications (I/O) ports of the system 1. In utilization scenarios of the invention per the referenced disclosures [1], [2] and [3], these I/O facilities can include adaptively shared time-division-multiplexed network buses (the input and output data path buses 18 and 19 in [3], bus 8 in [2], and bus 9 in [1]), where the application for any given data timeslot on such I/O buses is identified via specified overhead (parallel wires or in-band signaling) mechanisms. The processing applications so identified for the timeslots on input network interfaces of system 1 (e.g. bus 18 in [3]) can be used in formation of the CPU capacity requests 4 of the processing applications, and thereby, direct the scheduling of the CPU cycles among the processing applications running on the system 1.

In further embodiments, in a networked data processing system incorporating processors per [1] and this disclosure, a network or I/O processor per [1] can be used as a front-stage, directly processing and sending back to the network those of its received application data units (e.g. protocol packets) that it is able to do in its digital assembly line type, zero-buffering manner, while diverting to the second-stage processor per this invention the remaining data units needing more complex, e.g., multi-stage processing and processing over longer data fields.

In general, the CPU accessible data and instruction memory and I/O port space 16 of system 1 (FIG. 1) are commonly referred to as the input and output data arrays for the CPU 18.

Note further that any of the processing applications configured to run on the system 1, though they are commonly referred to in this disclosure as user applications, can in certain embodiments, e.g. at certain times such as period of system startup and configuration, be actually a system maintenance software application. Such maintenance application can perform task such as facilitating inter process communication among the processing tasks, and updating contents of the fast-access memory segments for the user applications, e.g. to reflect the currently running program threads of any given user application.

The operation of the individual elements of the data processing system 1 of FIG. 1 are described in greater detail in the following:

The digital logic system 1 includes a CPU cycle counter 2, which repeatedly counts from 0 up to the value configured as the number of CPU cycles in the CPU capacity allocation period less 1. For instance, if in a given embodiment the CPU capacity allocation period was configured to comprise 64 CPU cycles, the counter 2 counts periodically from 0 up to 63, incrementing its CPU cycle # count by one for every new CPU cycle (and rolling over to 0 once the cycle count had reached 63). For each new CPU capacity allocation period, the counter 2 gives a signal to the hardware scheduler 5 of the system 1 to run its optimization algorithm, which assigns the CPU cycles on the upcoming allocation period among the processing application programs configured to run on the system. The term CPU cycle here refers to a unit for time sharing CPU processing capacity; in various embodiments this can comprise more or less than one full instruction cycle, but in general the CPU cycle for the purpose of the discussion herein is to be understood as the smallest practical unit of CPU processing time in which some distinct step of application program stream processing can be performed. (Though alternative operating scenarios are possible, for clarity of this specification it can be understood that an application program processing steps one program instruction forward when the application executes on the CPU for one cycle assigned to it.)

In the embodiments studied here in greater detail, the optimization of the CPU cycle allocation among the processing applications is done at least in part based on indications 4 for the processing applications on the system 1 regarding how many CPU cycles any given application program can use on the next CPU capacity allocation period. In simple embodiments, these CPU capacity demand figures 4 for the individual processing applications can be binary: in such embodiments, this indication 4 for a given application is to be taken as an expression that the application is ready to execute on either none (e.g., when its binary ready status indicator is '0') or all (when its binary indicator is '1') of the cycles of upcoming CPU allocation period. Further still, in such simplified embodiments, the binary CPU capacity demand figure for a given processing application can be set to its active state whenever the given application is able to use at least one CPU cycle on the next CPU allocation period. In more elaborate embodiments, the CPU capacity demand figures 4 express the actual number of CPU cycles that any given application is able to use on the following CPU capacity allocation period. In a particular embodiment implementing such a more elaborate application CPU capacity request scheme, the figure 4 for each processing application is the sum of tasks within an application that are presently ready to execute. In a yet more complex embodiment, the figure 4 of a given application is the number of CPU cycles that all of the ready-state tasks of that application would altogether be able to use on the upcoming CPU capacity allocation period.

In embodiments of the invention, the application program CPU cycle demand figures 4 (or the factors for such figures) are automatically maintained by application software programs as hardware device registers mapped to the memory range 16, e.g. at a specified address offset within each application specific memory segment in the CPU memory space 16. A possible implementation scenario for this feature is that the ready (vs. waiting) status software variables of the constituent software tasks of an application software program are memory mapped to reside in such specified physical memory addresses. In such an implementation scenario, hardware logic of the system 1 can add up these task-specific ready-to-execute indicators for each of the processing applications of the system to form the application specific CPU cycle demand figures 4. In an alternative embodiment, each application software programs maintains a device register mapped counter for the number of currently active functions that is incremented at function calls and decremented at function returns.

With any such scenario for production of the indicators 4, these numbers, or binary indicators, as the case may be depending on the complexity of the embodiment, are updated at least once for each new CPU cycle allocation period, and made available for the hardware scheduler 5 for it to produce 6, once per an CPU allocation period, the CPU cycle # to processing application # assignments 8 for the next allocation period.

In an embodiment of the invention, the CPU-overhead-free, hardware logic scheduling method allocates the number CPU cycles comprising a CPU capacity allocation period, e.g. 64 CPU cycles, among those of the applications that were indicated via their respective CPU capacity demand figures 4 as ready to execute on the CPU. In various embodiments, this hardware logic based scheduling algorithm, in allocating the CPU cycles among the ready-state applications can involve also factors including i) fairness, ii) contractual conditions and iii) the quantities of CPU cycles demanded by the individual applications, in determining the optimal allocation of the CPU cycles among the processing applications.

In this regard, and considering the case of binary ready-to-execute status indicators 4, the rule of fairness when applied by the hardware scheduler 5 causes each application that is ready to execute to get an equal number of CPU timeslots on any given allocation period (except for the rounding errors, which can be averaged out over successive allocations periods). For instance, let us assume that there happened to be in average three ready-state application programs among which the assumed 64 CPU cycles on each of the successive CPU capacity allocation periods were allocated, and that the applications provided a binary form of indication 4 to signal their readiness to execute. In that case, each one among the three such processing applications would get an average of 64/3=21.33 CPU cycles on those of the CPU allocation cycles on which it was able to use the CPU cycles. I.e., over ten instances of such CPU capacity allocation periods on which the application program demanded CPU cycles (among two other applications), it will get 213 (or 214) CPU cycles assigned to it, out of the total of 640 CPU cycles in the ten periods.

Involving the contract based rules for the hardware scheduler 5, e.g. a rule that a given processing application is contractually entitled to some percentage, such as 25%, of CPU cycles, causes that the hardware scheduler will allocate at least that percentage worth of the CPU cycles to such an application on any CPU capacity allocation period for which said contract based processing application expressed a demand for at least said percentage of the CPU capacity. Naturally, the sum of the contractual CPU percentage allocation guarantees for the set of processing applications configured to run concurrently on the system 1 is not to exceed 100%.

As a general principle however, hardware scheduler algorithm according to various embodiments of the invention in any case assigns all the CPU cycles among the processing applications of the system 1 on all CPU allocation periods, and it does so with an objective of minimizing the greatest amount of unmet demand figures 4 across the range of processing applications in the system 1, while ensuring that all applications get at least their entitled (i.e., even division, or contract based, as applicable in any given scenario) share of CPU cycles on all the CPU allocation periods on which they so demanded. In one embodiment, the hardware scheduler 5 thus allocates the CPU cycles for the next allocation period so that first, all the actually materialized CPU cycle demands by the applications within their CPU-share entitlement ranges are met, and following that, the remaining CPU cycles are assigned in an even manner (e.g. one CPU cycle at time per application, starting for instance with a revolving application # for the sake of fairness) among the processing applications whose demand for CPU cycles had not been met by the amount of CPU cycles so far allocated to them.

In alternative embodiments where the objective of the application load adaptive processing hardware time-sharing of the invention is maximizing the processing throughput of one or more of the software applications sharing the system 1, the logic algorithm of the scheduler 5 may seek to meet the demands for CPU cycles by the processing applications on the system in their defined priority order. In a particular scenario, the scheduling algorithm will first seek to match the amount of CPU cycles demanded by the highest-priority application that expressed via its indicator 4 a demand for one or more CPU cycles on the upcoming allocation period, and if there were unallocated CPU cycles after that, do the same with the remaining cycles for the next highest priority application, and so on until all CPU cycles on the upcoming period are assigned among the applications on the system 1. In yet a further embodiment using such prioritization among the processing applications, the algorithm 5 can first scale down the CPU cycle demand figures 4 of the processing applications by defined scaling factors (e.g. in a range from 1/64 to 64/64 (in increments of 1/64)—with highest priority applications getting scaling factor 1 and lowest the factor 1/64), and then seek to match these priority-scaled demand figures by the set of processing applications on the system, using e.g. any of the optimization objectives discussed above.

Note however that for any optimization objectives per above, at regular intervals, the scheduler 5 needs to allocate for each processing software application at least one CPU cycle, to allow any application whose ready-to-execute status indicator 4 is presently at its inactive value to update such indicator of it to an active value, when so called for by the processing environment status of any given application.

As a further general principle, once the hardware scheduling logic 5 has determined the optimal allocation of CPU cycles for a given allocation period (e.g. sequence of 64 CPU cycles) among the ready-state processing applications, (for instance, in case of only two processing applications, say applications #3 and #14 being ready, application #3 getting the first 32 and the application #14 getting the final 32 of the CPU cycles on that sequence), the scheduling logic produces 6 a digital logic LUT 8 indexed with the CPU cycle # within the allocation period where each element identifies the processing application # that is to execute on its associated upcoming CPU cycle. Naturally, for consisted reading 9, 10, 11 of sequences of processing application IDs from LUT 8, the LUT 8 write 6 address is to be kept sufficiently apart from the LUT read access range, e.g. based on an offset from LUT 8 base-read address value 7.

Accordingly, for every new CPU cycle, the processing application ID # found in the element in said table 8 corresponding to given CPU cycle # forms the most significant bits (MSBs, or conceptual equals thereof) 10 for the CPU memory 16 access, causing the thus identified application program to execute on the CPU on that cycle. According to an embodiment of the invention, the individual application programs, including their processing instructions and data, reside in their application specific segments in the memory space 16 of the CPU, with each such segment having their respective processing application identifier as the MSBs 10 of the CPU memory address 15. For instance, in such an embodiment configured to support up to sixteen processing applications, each of the applications configured to run on the CPU can be identified with their identifiers #0, #1, #2, . . . #15, which, in that example case, as four bit digital numbers are the MSBs of the memory segment address ranges of their respective processing applications.

Once the CPU has produced the processing results 20 and 19 for the application selected by the LUT 8 output 9 to execute on the CPU on a given processing cycle, the CPU stores 19, 20 these outputs from it, including the updated processing context, in the CPU addressable memory segments (in RAM LSB LUT 12, RAM 16) dedicated to that processing application. Note in this regard that the RAM LSB look-up-table 12 is indexed by the processing application ID#, and thus CPU 18, when writing the updated LSBs 19 in that LUT 12 use the application ID# (a version of the active application identifying RAM MSB 9 delayed by suitable number of clock cycles to match the latency of the RAM 16 and CPU 18) of its present processing application as the write address index 11 to the LUT 12. In order to improve the clarity of the illustration of the functional system diagram 1, not each of the logic wires (e.g. write address for the LUT 8 or clock signals etc.) are individually shown where the intended functionality and suitable detail logic implementation of the system 1 and its elements are obvious based on this disclosure. Please refer to [2] and [4] for further descriptions for time division multiplexing operation of a data processing logic system time-sliced among a number of processing applications.

FIG. 2 shows examples of possible values in the schedules 8 produced by the scheduling logic 5 for successive CPU capacity allocation periods according to an embodiment of the invention. For simplicity of the diagram, in the illustrated embodiment, the number of CPU cycles within a capacity allocation period is assumed to be fairly low, i.e., sixteen. Also, the number of processing applications configured to run on the system 1 in parallel is assumed to be sixteen, identified as applications #A through #P. It is seen that schedules 8 of allocation and assignment of CPU cycles among the processing applications can change arbitrarily from one CPU capacity allocation period to next (as shown, from period 't−1' to period 't' and on to 't+1', and so on), as determined by scheduling algorithm hardware logic 5 based at least in part on the CPU cycle demand info 4 from the applications. Note also that the actual software application showing to system 1 as any given one among these processing applications, e.g., as processing application #C, can change from time to time.

FIG. 3 provides a clock cycle timing diagram illustrating the time sharing logic operation of the CPU 18 and its input and output buses among the processing applications configured to run on the system 1 according to sections of assumed CPU cycle to application allocation schedules 8. In particular, application context switching among assumed processing applications "A", "B", "C" and "D" is illustrated. Note that in digital system 1 implementations, the application ID symbols such as "A", "B", "C" etc. are naturally numeric IDs, e.g. 0, 1, 2, etc. The time sharing operation shown in FIG. 3 is accordant to the functionality expressed by the following Verilog Hardware Description Language pseudo-code for the logic:

```
/* direct logic assignments: */
// cpu_addrs_lsb is included with signal 14 in FIG. 1
    cpu_addrs_lsb = program_ctr_cpu;
    program_ctr_cpu_next = [logic function, e.g.
    "program_ctr_cpu+1"];
/* registered: */
    always @ ( posedge clock ) begin
    // appl_id_a1 equal to signal 9, appl_id to signal 10 in FIG. 1
        appl_id <= appl_id_a1;
    // program_ctr_cpu equal to signal 13 in FIG. 1
        program_ctr_cpu <= program_ctr_array[appl_id_a1];
        program_ctr_array[appl_id] <= program_ctr_cpu_next;
    end
```

Note that, in various embodiments, a number of variations of the phasing of the logic operations per the above pseudo-code and the logic timing diagram in FIG. 3 will be possible; the signal phasing per above pseudo code fragment and FIG. 3 are intended to illustrate the main time slicing operation the system 1, and should not be understood in any restrictive sense, since functionally equal time sharing operation can be achieved by phasing the related logic operations in a number of different ways.

For instance, in alternative embodiments, the equal of above pseudo coded logic could include a local registered copy of the signal program_ctr_cpu_next, called herein as program_ctr_cpu_next_reg, which would be stored in the program_ctr_array 12 with a delayed by one clock cycle version of the signal appl_id 30. In such an embodiment, on CPU cycles following the first cycle in a continuous sequence of cycles assigned to a given application, the program_ctr_cpu_next_reg is used in place of program_ctr_cpu (which is retrieved from the LUT 12) as the base value for computing the new value for program_ctr_cpu_next. While such an alternative embodiment may be better suited for logic implementation, in particular meeting the physical circuit timing specifications, its operation would be more complex to explain in particular regarding the illustration of the main inventive concepts, and as such the above pseudo code and FIG. 3 present a behaviorally simpler version of the time sharing logic operation of the system 1.

Moreover, for clarity of illustration, in FIG. 3 the computation for the signal program_ctr_cpu_next is assumed to also to be equal to progam_ctr_cpu+1, although in various operating scenarios for any given application software, also various other type jumps of the program counter from one instruction cycle to the next are possible. Any such jumps would however be transparently supported by the hardware of system 1.

In FIG. 3, also for clarity, only four processing applications, labeled as "A", "B", "C" and "D" are shown. In various operating scenarios, such as in the examples of FIG. 2, more (or fewer) applications could be present at a time interval such as shown in FIG. 3. Note also that in the scenario of FIG. 3 there is a CPU capacity allocation period boundary 39 between the two shown subsequences of the CPU cycle to application allocation schedules, and that the logic operation of the system proceeds without a disruption across the CPU capacity allocation period boundary, even with the updating of the CPU cycle to application ID # allocation schedule 8 that occurs at the period 39 boundaries. For simplicity of illustration of FIG. 3, it is assumed that the processing applications assigned CPU cycles on the schedules on both sides of the boundary 39 shown in FIG. 3 are among the set of four applications "A" through "D". Finally, the initial program counter values shown for these software applications, i.e., 1000 for application "A", 2000 for "B", 3000 "C" and "4000" for "D" are arbitrary, and chosen for clarity of illustration.

Note further that CPU clock edges shown in FIG. 3 as well as the 'clock' positive edges considered in the above pseudo code represent the clock signal edges marking the completion of CPU instruction cycles. In various embodiment, there may be further clock edges relevant for e.g. the CPU logic and registers between the shown clock signal transitions marking instruction cycle boundaries.

Operation Principles:

The application load adaptive data processing throughput maximization algorithm of the invention, performed in FIG. 1 by the hardware logic of system 1 (outside the actual CPU 18), comprises the following primary algorithm steps:

(1) monitoring ready-to-execute indicators 4 of one or more applications among the processing software applications on the system 1 expressing (a) whether a given software application is currently ready to execute on the CPU 18, and/or (b) how many CPU cycles the given application is a currently able to consume;

(2) once in a set of CPU cycles referred to as an allocation period, allocating by the scheduler 5 the set of CPU cycles on the upcoming allocation period among the processing applications sharing the CPU at least in part based on values of the ready-to-execute indicators 4 of said applications;

(3) and controlling time sharing of the CPU among said set of processing applications according to the allocating of the CPU cycles by the scheduler logic 5.

Thereby, the invented data processing system 1 hardware dynamically optimizes the allocation of its processing timeslots among a number of concurrently running processing software applications, in a manner that is adaptive to the realtime processing loads offered by the applications, without having to use any of the CPU capacity for any non-user (system) software overhead functions.

Software-Hardware Interfacing:

The application load adaptive data processing system 1 maintains the applications' (and their tasks' and/or threads') ready-to-execute status indicators in pre-specified CPU physical memory addresses (within the CPU memory space 16) that are mapped into device registers that can be read-accessed 4 by the hardware scheduler logic 5. An example of C programming language statement to map a software variable (with an assumed name of) *pTaskStatus to an assumed desired logic device register at CPU address 0042CD00(hex) is as follows:

volatile short *pTaskStatus=(short *) 0x0042CD00;

The software application can keep its indicators as to whether it is ready to use CPU cycles on the next CPU capacity allocation period in this variable *pTaskStatus, and the hardware logic 5 will run its scheduling algorithm for the successive CPU capacity allocation periods using as its inputs 4 the values of the device registers storing the *pTaskStatus indicators for the range of processing applications configured to run in parallel on the system 1. Naturally, in various embodiments, the ready-to-execute status indicators can have varying software names, types and CPU addresses, but for the sake of readability of this specification, we assume here that all software applications running on systems 1 use the name *pTaskStatus for storing their ready-to-execute status indicators.

In a simple embodiment, *pTaskStatus variable of any given software processing application on system 1 can be a plain binary variable, and in such scenarios, the hardware scheduler algorithm 5 by default allocates the CPU cycles on the successive capacity allocation periods evenly among those of the processing applications that had their *pTaskStatus indicators at their active states, e.g. at binary '1'.

In further embodiments, the individual software applications running in parallel on a system 1 can keep at their ready-to-execute indicator device registers a number (e.g. in an assumed range of 0 to 256) expressing how many CPU cycles the given software application demands for itself (e.g. based on how many CPU cycles it is able to use) on the upcoming CPU capacity allocation period, and the scheduler 5 will run its CPU capacity allocation optimization algorithm using these CPU cycle demand figures from the processing applications as its input 4. Still in further embodiments, each processing application on a system 1 can use a measure such as the number of presently active software functions (using the C language terminology, but referring also to equals in all other software programming languages), i.e., software functions that at a given time were called but had not yet returned, as the value for its *pTaskStatus indicator, however with the exception of *pTaskStatus being masked to its inactive value (e.g. zero) whenever the software application is waiting for some external event to occur (e.g. external inputs signaling arrival of certain data, or completion of given block data transfer etc.) before resuming its execution. In a particular embodiment, such a functionality is implemented using two separate device register mapped software variables (both similar to *pTaskStatus per above): (a) one variable for keeping track of the number of presently active software functions (and equals), and (b) another that is kept by the application software at its active state whenever a function is executing, and at its inactive state whenever the otherwise running function is waiting for an occurrence of external event (e.g. data from user). In such embodiments, both of these application status indicators 4 (i.e., (a) and (b) per above) are provided to the scheduler hardware logic 5, and the algorithm of scheduler 5 will consider the active function count variable (otherwise based on indicator (a) per above) of given processing application to zero if the software application in question was indicated to be in a waiting mode by the indicator (b) in determining the optimal allocation of the CPU capacity among the processing applications on system 1.

In any embodiment as discussed above, the scheduler 5 will run its CPU capacity allocation optimization algorithm, based on rules as follows:

i) ensure that each processing software application is allocated at least one CPU cycle per intervals such as N (N is any positive integer, e.g. 16) CPU capacity allocation periods, to allow any application whose *pTaskStatus is presently at its inactive value (e.g. at zero), when appropriate based on external factors, e.g. input/output function status etc. of any given application, to update its *pTaskStatus indicators back to a value expressing that the given application demands one or more CPU cycles on the next CPU capacity allocation period;

ii) with step i) is satisfied, minimize the greatest amount of unmet demands among the processing applications, while ensuring that all applications, whenever they so demand, get at least their entitled (i.e., even division, or contract based, as applicable in any given scenario) share of CPU cycles on the upcoming allocation period; and iii) in case there were no unmet demands after the preceding steps, allocate any remaining CPU cycles on the given period evenly among the applications that were indicated as ready to execute, starting the step iii) from a revolving processing application (e.g. incrementing the starting processing application # by 1 for each allocation period, and rolling over to #0 from the application with greatest # in the system 1). In an alternative implementation of the step iii), the surplus CPU cycles after step ii) can be allocated evenly across all the processing applications, including those that were indicated as not ready to run.

In embodiments, the hardware scheduler logic 5 produces 6 the CPU-cycle to application # schedule tables 8 based on the ready-status indicator bits 4 of the processing applications periodically, e.g. once for every new sequence of 64 CPU cycles, as indicated by new allocation period pulses on signal 3 from the CPU cycle counter 2 of FIG. 1.

Context-Switching for the CPU by Hardware Logic:

When hardware context switch is to occur, the hardware scheduler stores 19 into an application# indexed array 12 the updated processing context (incl. the next LSBs of CPU memory bus address) for the outgoing application (after the present application has incremented its program counter LSBs to next address, but not yet loaded-in the data from that CPU address), and, for the first cycle of the incoming application's execution load from that same LSB array 12 the incoming application's value for the CPU memory address LSBs and CSs 14. This will generally work if the CPU does not use the values of its internal registers, applicable for execution of one of its applications (e.g. the outgoing application), in execution of another (e.g. the incoming) application. For maximized logic usage efficiency of embodiments of system 1, the clock cycle stages of any pipeline at CPU should be independent (processing at one pipeline stage does not depend from another stage). Otherwise, along with the CPU program memory LSBs (i.e. the value of the program counter), also all the values of CPU registers of the outgoing application need to be stored in the application-indexed processing context array 12.

In scenarios where the processing application may be switched within applications' instruction cycles, the CPU registers whose application processing context specific values need to be stored in the array 12 include the timing counter that keeps track of CPU clock cycle phase of execution of the program instructions. For example of storing and retrieving the timing counter, let us a consider a case where the execution of a given instruction takes four CPU clock cycles, with a specific micro-operation—e.g., i) fetch instruction from memory, ii) decode instruction, iii) perform the arithmetic, logic or shift (ALSU) functions on the data, iv) store the results—scheduled for each of the four timing counter identified clock cycles. Let us then assume that the application context switch occurred when the example application's instruction had been processed through its second phase (e.g., the instruction had been fetched and decoded, i.e., the ALSU function to be performed had been identified). At the end of that clock cycle, the CPU register context for the example application, including the instruction decode result (e.g., shift one left), and the timing counter value (2, for next timing clock cycle for the application, when counting from 0 though 4) are written into the LUT 12, in the index corresponding to our example application. When that application is again switched in for processing by the CPU, it will resume at clock cycle phase 2 (e.g., perform the shift left operation on the data) of executing its four clock cycle instruction.

Benefits of the invented, application load adaptive, operating system overhead free multi-user data processing system include:

1) All the CPU processing time can be made available for the user applications, as there is no need, at least at times other than the system startup and maintenance, for a common system software to run on the CPU (e.g. to perform the traditional software operating system tasks such as time tick processing, serving interrupts, scheduling CPU access between the various application programs, and managing the context-switching between the running programs);
2) The application programs do not experience any considerable delays in ever waiting access to their (e.g. contract-based entitled) share of the CPU time as any number of the processing applications configured for the system can run on the CPU concurrently in a CPU cycle by CPU cycle interleaved manner;
3) The allocation of the CPU processing time among the processing applications is adaptive to the realtime processing loads of the applications, providing dynamically optimized system processing throughput;
4) There is inherent security and isolation between the individual processing applications in the system, as each application resides in its dedicated segment(s) within the system memories, and uses the shared processing system effectively the same way as if it was the only application running on it.

Altogether, the invention thus enables maximizing the data processing throughput across all the processing applications configured on the shared computing system, while providing deterministic minimum performance and architectural security for each application.

The hardware based scheduling and context switching of the invented system accordingly ensures that any given application gets at least its entitled time share of the shared processing system capacity whenever the given processing application actually was able to utilize at least its entitled quota of system capacity, and as much processing capacity beyond its entitled quota as is possible at any given time without blocking the access to the entitled and fair share of the processing capacity by any other processing application that is actually able at that time to utilize such capacity. The invention thus enables any given user application to get access to the full CPU processing capacity whenever the given application is the sole application offering processing load for the shared CPU. In effect, the invention provides for each user application assured access to its contract based percentage (e.g. 10%) of the CPU capacity, plus most of the time much greater share, even 100%, of the processing system capacity, with the cost base for any given user application being defined by only its committed access percentage worth of the processing system costs.

Accordingly, the invention enables continuously maximizing data processing throughput among variable load processing applications, while ensuring that any given application will get at least its entitled share of the processing system capacity whenever the given application is able to actually use at least such portion of the system capacity. Various other types of applications of the invented mechanisms naturally are possible as well.

Conclusions

This detailed description is a specification of embodiments of the invention for application examples and illustrative system operation scenarios discussed in the foregoing. Specific application, architectural and logic implementation examples are provided in this and the referenced patent applications for the purpose illustrating possible reference implementations of the invented concepts, as well as related utilization scenarios. Naturally, there are multiple alternative ways to implement or utilize, in whole or in part, the principles of the invention as set forth in the foregoing. Generally, those skilled in the art will be able to develop different versions and various modifications of the described embodiments, which, although not necessarily each explicitly described herein individually, rely on the principles of the invention, and are thus included within its spirit and scope. It is thus intended that the specification and drawings be considered not in a restrictive sense, but as exemplary only, with a true scope of the invention being indicated by the following claims.

What is claimed is:

1. An application load adaptive digital data processing system, comprising:
    a time shared central processing unit (CPU) for processing data and instructions from input data arrays of the system and storing results in output data arrays of the system; and
    a scheduler for periodically, once in a set of CPU cycles referred to as an allocation period, producing a schedule that assigns a set of CPU cycles on an upcoming allocation period among a set of software applications sharing the time shared CPU,
    wherein the producing of the schedule by the scheduler is done at least in part based on ready-to-execute indicators by at least some among the set of software applications expressing how many CPU cycles on the time shared CPU a given software application is ready to use on the upcoming allocation period,
    wherein at least one of the ready-to-execute indicators comprises a number indicating a quantity of CPU cycles that its associated software application is currently ready to consume,
    wherein the at least one of the ready-to-execute indicators comprises a software variable mapped to a device register within a memory space of the time shared CPU, with said device register being accessible by the scheduler,
    wherein the time shared CPU processes data and instructions of at least some of the set of software applications on the upcoming allocation period with the CPU cycles assigned among the applications according to the schedule produced for that allocation period by the scheduler, and
    wherein said CPU cycle is one of: individual CPU clock cycle, or individual CPU instruction cycle.

2. The system of claim 1, wherein the scheduler is implemented in hardware logic.

3. The system of claim 1, wherein the input and output data arrays comprise at least one of: i) CPU accessible memories, and ii) CPU accessible input and output communication ports.

4. The system of claim 1, wherein the schedule comprises a digital look-up-table (LUT) within hardware logic of the system, with said LUT storing sequences of application identifiers for CPU allocation periods, and with the application identifiers in successive addresses of the LUT directing multiplexing of application processing contexts for the time shared CPU for successive CPU cycles of the allocation periods.

5. A method for allocating, by a scheduler implemented in digital hardware logic, a processing capacity of a time shared CPU among a set of software applications, the method comprising steps of:

monitoring ready-to-execute indicators of one or more applications among a set of software applications, with said ready-to-execute indicators expressing how many CPU cycles on the time shared CPU the given application is currently able to consume;

once in a set of CPU cycles referred to as an allocation period, allocating a set of CPU cycles for an upcoming allocation period among said set of software applications sharing the time shared CPU at least in part based on values of the ready-to-execute indicators of one or more of said set of applications;

controlling a time sharing of the time shared CPU among said set of software applications according to the allocating of the CPU cycles by the scheduler, wherein at least one of the ready-to-execute indicators comprises a number indicating a quantity of CPU cycles that its associated software application is currently ready to consume, wherein the at least one of the ready-to-execute indicators comprises a software variable mapped to a device register within a memory space of the time shared CPU, with said device register being accessible by the scheduler, and wherein said CPU cycle is one of: individual CPU clock cycle, or individual CPU instruction cycle.

6. The method of claim 5, wherein the step of allocating the time shared CPU cycles for at least some of the allocation periods is done so that (i) first, any actually materialized CPU cycle demands by any applications up to their entitled share CPU capacity are met, and (ii) following that, any remaining CPU cycles are assigned in an even manner among the applications whose demand for CPU cycles had not been met by the amount of CPU cycles so far allocated to them.

7. The method of claim 5, wherein the step of allocating the time shared CPU cycles for at least some of the allocation periods is done so that (i) first, any actually materialized CPU cycle demands by any applications, up to their entitled share CPU capacity, are met, and (ii) following that, any remaining CPU cycles are assigned in an even manner among all the applications.

8. The method of claim 5, wherein the step of allocating the time shared CPU cycles among the set of software applications produces sequences of application identifiers stored in a hardware logic digital look-up-table (LUT), with the application identifiers stored in successive addresses of the LUT for a given allocation period directing multiplexing of application processing contexts for the time shared CPU for successive CPU cycles of the given allocation period.

* * * * *